US005737878A

United States Patent [19]

Raulerson et al.

[11] Patent Number: 5,737,878

[45] Date of Patent: Apr. 14, 1998

[54] DOOR FRAME GUARD DEVICE

[76] Inventors: David B. Raulerson, 2808 W. 12th St., Panama City, Fla. 32401; Charlie E. Day, Jr., P.O. Box 15055, Panama City, Fla. 32406

[21] Appl. No.: 707,635

[22] Filed: Sep. 5, 1996

[51] Int. Cl.$^6$ .......... B60J 5/00

[52] U.S. Cl. .......... 49/462; 52/717.01

[58] Field of Search .......... 49/462, 460, 504; 52/717.01, 211

[56] References Cited

U.S. PATENT DOCUMENTS

| | | | |
|---|---|---|---|
| 1,620,933 | 3/1927 | Wilcox | 52/717.01 |
| 2,837,787 | 6/1958 | Wright | 49/462 X |
| 3,271,919 | 9/1966 | Olton | 52/717.01 |
| 3,299,592 | 1/1967 | Cable | 52/717.01 X |
| 3,318,061 | 5/1967 | Stentz | 49/462 X |
| 3,391,509 | 7/1968 | Fruman | 49/462 |
| 3,416,282 | 12/1968 | Daugherty | 49/462 X |
| 4,443,508 | 4/1984 | Mehl | 52/717.01 |
| 4,719,729 | 1/1988 | Wynar | 52/717.01 X |
| 4,768,320 | 9/1988 | Weller | 52/717.01 X |
| 4,858,384 | 8/1989 | Blankenship | 49/460 |
| 5,488,804 | 2/1996 | Batscher | 49/462 |

FOREIGN PATENT DOCUMENTS

| | | | |
|---|---|---|---|
| 1351120 | 4/1974 | United Kingdom | 49/462 |

*Primary Examiner*—Jerry Redman
*Attorney, Agent, or Firm*—Carnes Cona Dixon

[57] ABSTRACT

The present invention is a door frame guard device which is removably secured to a conventional door frame or door jamb. The door frame guard device of the present invention comprises at least one component having a U-shape. This design will provide for the component to include three walls. For enabling the device to be attached to the side of the door jamb having hinges, at least one wall of the component is provide with a plurality of openings. These openings will receive the hinges and will render a device which is removably secured onto a door frame. Additional components can be utilized for additional coverage.

9 Claims, 3 Drawing Sheets

DOOR FRAME GUARD DEVICE

BACKGROUND OF THE INVENTION

1. Field of the Invention

The present invention relates generally to a device which is designed to protect furniture, appliances, door openings and the like and more particularly to a device which is adapted to be removably secured to the inner surface of any conventional door frame and door jamb.

2. Description of the Prior Art

For years, individuals, families, and businesses have gone through the process of moving from one location to a new and different location. Typically, most, if not all of their belongings are moved with them. For years, individuals, families, and businesses have purchased new and useful items, which at times can be large and bulky. These items, such as furniture, office equipment, and the like, are used to aid and assist the purchaser as well as provide for a comfortable and workable environment.

Moving these items can be a challenge. Due to the excess weight of many of these typical items, in combination with their awkward size, carrying them through a door can prove to be a risk, since there exists a chance for the item move to contact and engage the door frame. This contact can cause damage not only to the door jamb and trim, but also to the item being moved.

Further still, when a building is under construction, the door ways are generally not protected. This is clearly an invitation for workers and/or tools, such as ladders, dry wall, molding, appliances, cabinets, or the like, to collide with the door frame, thus causing damage to the door and possibly to the items which come into contact with the door frame.

Accordingly efforts have been made for protecting a door frame to inherently provide protection to the items which are being transported.

One such device, which provides a means of protecting a door, is disclosed in U.S. Pat. No. 5,488,804 issued to Batscher. Batscher discloses a U-shape structure which is adapted to be removably secured to the edge of a conventional hung door for protecting the door. As such, this device includes a bumper extending outwardly from one wall and a wedge extending outwardly from the adjacent wall. The bumper is used to contact the wall in the room for avoiding collision between the wall and door. The wedge will contact the interior of a door jamb. This device may successfully protect a door, but cannot protect the door frame. Batscher fails to disclose a means of accepting the conventional hinges on the door, and as such provides a device which can only be utilized on a door and not on a door frame.

Accordingly, it is seen that this and other previous efforts do not provide the benefits intended with the present invention, such as rending a cover which is adapted to be removably secured to any conventional door frame. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides a door frame guard device which is adapted to be removably secured to any conventional door way. The door frame guard of the present invention includes at least one side plate. This side plate is adapted to be secured to a side of a conventional door frame. Additional side plates can also be provided to provide for the entire door frame to be protected. In order to accommodate this configuration, the door frame guard of the present invention can include a first inner side plate, a second inner side plate, and an upper inner side plate.

The first inner side plate is adapted to be removably secured to a first side wall of a conventional door frame having the door hinged thereto. The second inner side plate is adapted to be removably secured to a second side wall of a conventional door frame having the means to receive the latch mechanism of the conventional door. The upper inner side plate is adapted to be removable secured to the upper wall of a conventional door frame.

As such, the first side wall, second side wall and upper wall are designed and configured to be U-shape, wherein the first side wall and/or second side wall include grooves for receiving the hinges of a conventional door.

To successfully employ the invention, at least one inner side plate is removably secured to the conventional door frame. This will provide for at least one side of the door frame to be protected. For added protection, the second side plate can be removably secured to the opposite parallel side of the door frame. For those who wish to provide protection to the entire door frame, the upper inner side plate can be utilized in combination with first and/or second inner side plate.

The door frame guard device of the present invention is designed to be versatile in order to fit the needs and desires of the user and the environment. The structure of the door frame guard device is such that it can be utilized on the outer edges of a conventional door as well as be used on a conventional door frame. The use of two sets of door frame guard devices will enable protection to the edges of the conventional door and protection to the conventional door frame.

Accordingly, it is the object of the present invention to provide for a door frame guard which will overcome the deficiencies, shortcomings, and drawbacks of prior door frame guards and methods thereof.

It is yet another object of the present invention to provide for a door frame guard which can be utilized on any conventional door for providing protection not only to the frame but from items which may impact and collide with the door frame.

Another object of the present invention is to provide a door frame guard device which is versatile and which may be adapted to be removably secured not only to the conventional door frame, but can also be removably secured to the outer edges of a conventional hung door for enabling the door, as well as the frame, to be protected from impacts and collisions from items passing through the frame.

Still another object of the present invention, to be specifically enumerated herein, is to provide a door frame guard device in accordance with the preceding objects and which will conform to conventional forms of manufacture, be of simple construction and easy to use so as to provide a device that would be economically feasible, long lasting and relatively trouble free in operation.

Although there have been many inventions related to guard devices for protecting furniture, doorways and the like, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

The present invention is designed and configured to be used in combination with a conventional door frame. This will provide for a door frame guard device which is adapted to be removably secured to a conventional door frame or the outer edges of a conventional door quickly, easily and efficiently.

Figure 1A:
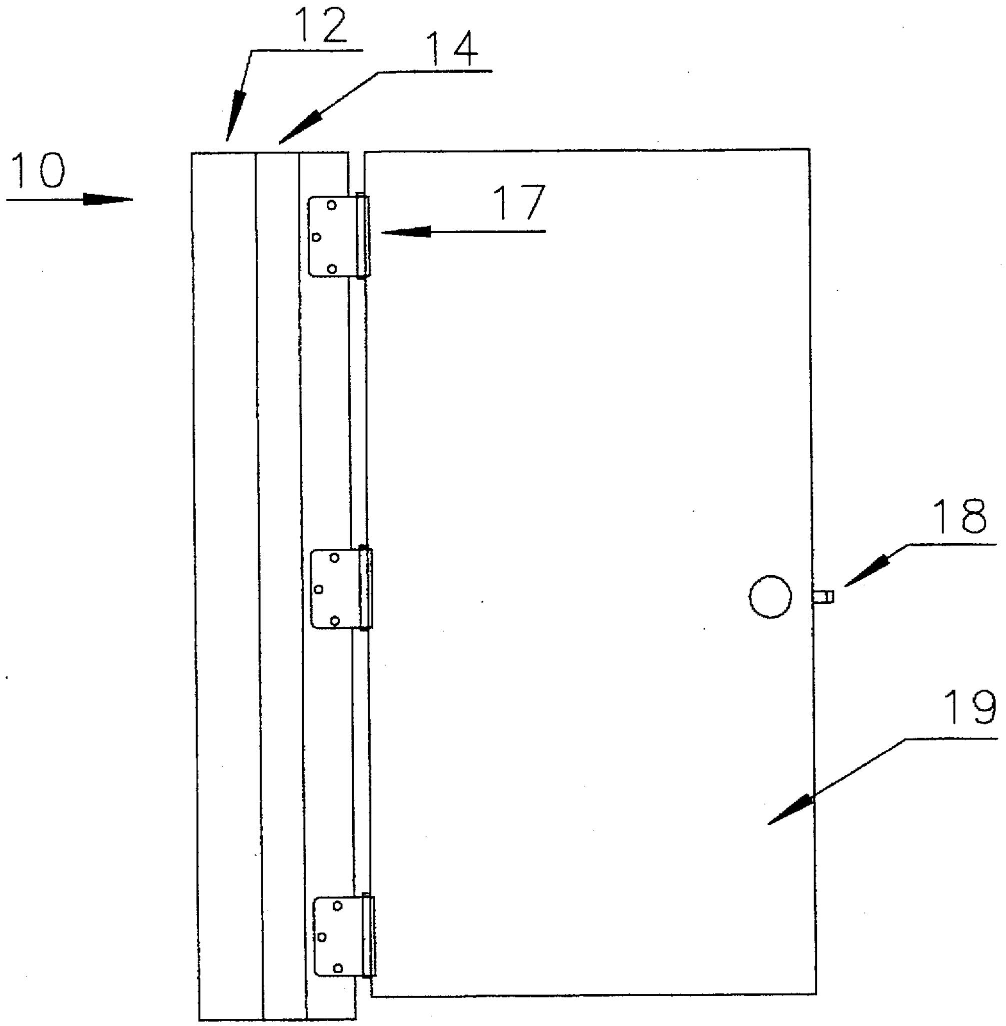
FIG. 1a Prior Art
FIG. 1*a* front planar view of a conventional door frame having a door hingedly attached thereto.
Figure 1B:
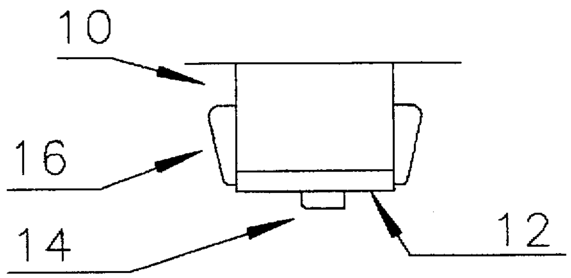
FIG. 1b Prior Art
FIG. 1*b* is a cross-sectional view of a conventional door frame.
Figure 6:
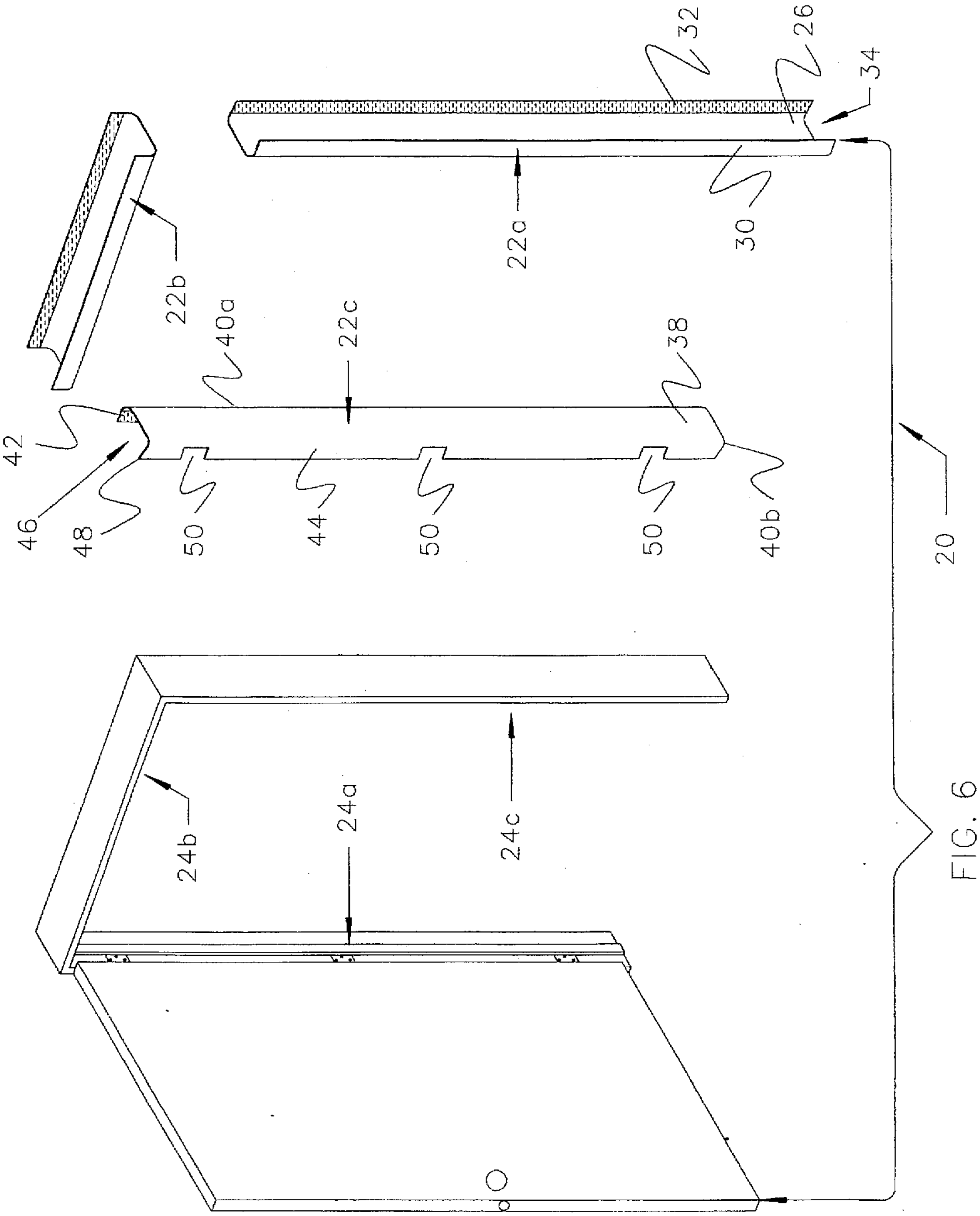
FIG. 6 is a perspective view of the door frame guard device prior to being secured to a conventional door jamb.

As seen in FIGS. 1*a*, 1*b* and 6, the conventional door frame 10 includes a frame 12 having an exterior or interior door 19 secured thereto via the use of hinges 17. The frame 12 includes a door locking bolt 18 and a door stop 14 which acts as not only a natural stop for the door, but also provides for the door to be in sealed configuration when closed. Door jamb trim or molding 16 can also be added for aesthetic purposes.

The cover of the present invention, as illustrated in FIGS. 2*a*–6 is adapted to be removably secured to any conventional door frame (see FIGS. 1*a*, 1*b*, and 6). This will provide a guard or a protection means for protecting the door when items, such as furniture or the like, are being transported through the doorway. Optionally, the guard of the present invention can also be utilized on the outer edges of the conventional door. This will provide for added protection to the door itself to inherently eliminate the possibility of items impacting and contacting the edge of the conventional door.

The door frame guard device 20 of the present invention includes at least one component which is adapted to be removably secured to at least one side wall of a conventional door frame. Preferably, a minimum of two components are used so as to enable the two parallel side walls of the conventional door frame to be protected. For added security, a third component can be used for protecting the upper inner surface of the conventional door.

As seen in the figures, the door frame guard device 20 of the present invention includes a first component 22*a*, for a first side of a doorway 24*a*, a second component 22*b*, for a top side of a door way 24*b* and a third component 22*c*, for a second side parallel to the first side 24*c*. These components 22*a*, 22*b*, 22*c*, respectively, are adapted to be removably secured to the conventional doorway, such as the one illustrated in FIGS. 1*a*, 1*b*, and 6. To successfully employ the invention, only one component can be used. The use of two or more components will provide for added protection to the conventional door frame.

The first component 22*a* and second component 22*b* are identical in shape and design, except that the second component 22*b* is typically shorter in length. This longer length component will engage a first side wall 24*a* of the frame while the shorter component will engage the top wall 24*b* of the conventional door frame. The second component, or top wall of the device, is not separately described in detail since it is identical in design as to the first component illustrated in FIGS. 2*a*, 2*b*, 3 and 5, except that it is typically shorter in length than the first component. This length difference is illustrated in FIG. 6.

As seen in FIGS. 2*a*, 2*b*, 3, 5 and 6, the first component 22*a* of the guard 20 is U-shape, and includes a first planar wall 26 which is adapted to contact the door stop 14 of a conventional door 19 once the guard 20 is attached thereto. For securing this member 22*a* to the frame, a securing means is provided. The securing means is simple in design and is located at opposite ends 28*a* and 28*b*, respectively, of the planar wall 26.

The securing means comprises a first member 30 and a second member 32. The first member 30 extends slightly inwardly and upwardly from a first end 28*a* of the first wall 26. The second member 32 extends slightly inwardly and upwardly from a second end 28*b* of the planar wall 26. The first member 30 and second member 32 extend towards each other but do not contact one another. This will provide for a gap 34 to be located therebetween. This gap 34 will receive the door frame to provide for the first member 30 and second member 32 to engage the outer edges of the conventional door frame (see FIG. 5).

Figure 2A:
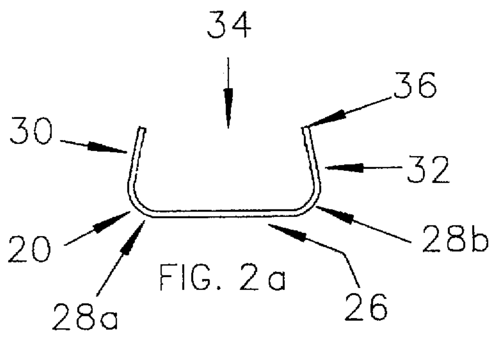
FIG. 2*a* is a cross-sectional view of the first embodiment of the door frame guard device of the present invention.
Figure 2B:
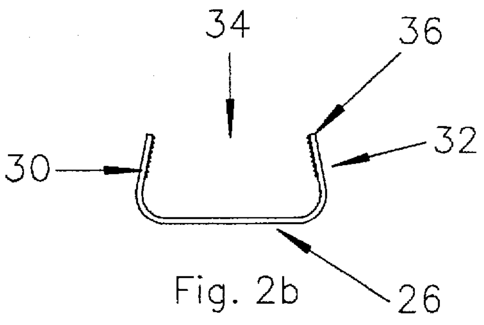
FIG. 2*b* is a cross-sectional view of the second embodiment of the door frame guard device of the present invention.
Figure 3:
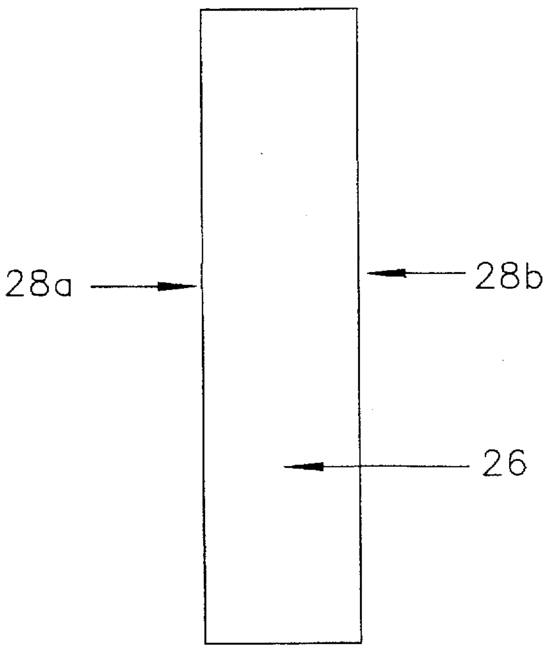
FIG. 3 is a front planar view of the door frame guard device of the present invention.

As illustrated in FIG. 2*a*, the tips 36 of the first member 30 and second member 32 can be fabricated from a material having a high coefficient of friction, such as a polymer, or the like. Optionally, and as seen in FIG. 2*b*, the tips 36 of the first member 30 and second member 32 can be coated with a material having a high coefficient of friction (material is illustrated, but not labeled) for providing for this material to contact and engage the conventional doorway 10. The use of material having a high coefficient of friction will provide a structure which is highly resistive to movement. Accordingly, this will provide for a cover which will securely engage the doorway once attached thereto. Inherently, eliminating any possibility for the device 20 to be removed therefrom.

Figure 4:
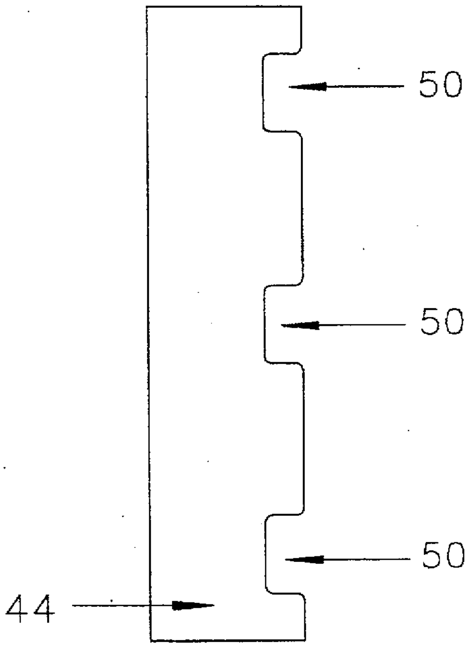
FIG. 4 is a side view of the second side wall of the door frame guard device of the present invention.

The component described above is ideal for use on the walls of the door frame without hinges. However, to accommodate for the conventional hinges, the first member 32 is altered. This alteration is illustrated in FIG. 4 and FIG. 6. As seen, this in the drawings, this altered component constitutes the third component 22*c* of the present invention. This third component 22*c* will render a device which will accept the hinges of the conventional door frame.

As seen in these figures the third component 22*c* is U-shape and includes a second planar wall 38 having opposite ends 40*a* and 40*b*. Extending upwardly from each end is a first member 42 and a second member 44.

The first member 42 extends slightly inwardly and upwardly from a first end 40*a* of the second planar wall 38. The second member 44 extends slightly inwardly and upwardly from a second end 40*b* of the planar wall 38. The first member 42 and second member 22 extend towards each other but do not contact one another. This will provide for a gap 46 to be located therebetween. This gap 46 will receive the door frame to provide for the first member 42 and second member 44 to engage the outer edges of the conventional door frame (see FIG. 5).

The tips 48 of the first member 42 and second member 44 can be fabricated for a material having a high coefficient of friction, such as a polymer, or the like. Optionally, the tips 48 of the first member 42 and second member 44 can be coated with a material having a high coefficient of friction for providing for this material to contact and engage the convention doorway 10.

To enable the gap to engage the outer wall of the conventional door frame 10, the first member is provided with a plurality of openings 50. These openings, as seen in FIGS. 4 and 6 render a member which can accept the hinges 17 on a conventional door.

Figure 5:
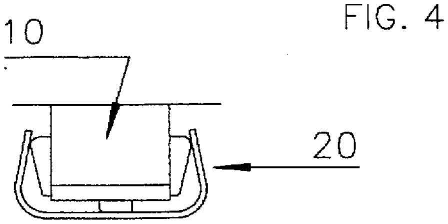
FIG. 5 is a cross-sectional view of the door frame guard device secured to a conventional door frame.

The openings 50 are designed and configured to receive the hinges of the door when the door is in a hung position on the frame, as illustrated in FIGS. 1*a* and 6. As seen in FIGS. 4 and 5, the member of the component includes an upper edge and a lower edge (illustrated, but not labeled). The upper edge, as shown, is secured to the planar wall 26. To accommodate these hinges, and as seen in FIGS. 4 and 6, the openings 50 extend from approximately the upper edge to the lower edge. This will provide for the opening to be a groove or receiving means for receiving the hinge which is secured to the door. For successfully receiving this hinge, as seen in FIGS. 1*a* and 6, the opening 50 must extend to the lower edge of the first or second member, as illustrated in FIGS. 4 and 6.

Accordingly, to utilize the device, the user merely takes the first component 22*a* and faces the gap 34 towards the wall of the frame which does not include the hinges. The first planar wall 26 is pushed to provide for the gap 34 of the first component 22*a* to receive the first wall of the door frame. The first member 30 and second member 32 will engage the side of this first wall (see FIG. 5) for providing the first component to be secured to the first side of the door way. The second component is secured to the frame as described above.

The third component 22*c* is secured as described above, except that the member having the openings 50 are aligned with the hinges 17 of the conventional door. This will provide for the openings 50 to receive the hinges and enable the third component 22*c* to be secured thereto.

The material used should be flexible, for enabling easy installation and removable, and must be adapted to absorb shock should an impact occur. This will provide a device which will protect both the items passing through the doorway as well as the doorway itself. Thereby, the material should include polymers, rubbers, or the like.

The first, second, and third component can also be utilized on the edges of the conventional door, to provide for a guard device which will render protection to the door frame as well as to the door.

The above described embodiment can be altered to be a single structure unit. This will provide for the first component to be integral to the second component and the second component to be integral with the first.

For reducing cost, the components described above can have the same configuration. This will provide for the manufacture to produce one component having the shape, size and design of the third component 22*c*. Thereby, producing a product which has a plurality of openings 50 on a side wall. This will enable the consumer to purchase at least one component and render a component which can be used on any side wall of a conventional door frame. Additional components, of the same configuration, can be purchased for the other side walls. The user can also cut the component to the desired size. Thereby providing an article which is useful and versatile.

While the invention has been particularly shown and described with reference to an embodiment thereof, it will be understood by those skilled in the art that various changes in form and detail may be made without departing from the spirit and scope of the invention.

We claim:

1. A door frame guard device to be used in combination with a conventional door jamb have a door hingedly attached thereto and including a first side wall, a second side wall, and a third side wall, said door frame guard device comprising:

at least one component;

said at least one component being removably secured to at least one side wall of a conventional door jamb having a door hingedly attached thereto;

each component is U-shaped and includes a planar wall having opposite ends, a first member and a second member extends outwardly from each end;

said first member and said second member each include an upper edge and a lower edge;

said upper edge is secured to said planar wall;

said first member includes a plurality of openings; and said openings extends to said lower edge of said first member for providing said openings to be a groove and a receiving means for receiving hinges of said door.

2. A door frame guard device as in claim 1 wherein said first member and said second member each include tips, and said tip are coated with a material having a high coefficient of friction.

3. A door frame guard device as in claim 1 wherein said at least one component is formed from a polymer.

4. A door frame guard device as in claim 1 wherein said at least one component is formed from a rubber.

5. A door frame guard device to be used in combination with a conventional door jamb having door hingedly attached thereto and including a first side wall, a second side wall, and a third side wall, said door frame guard device comprising:

a first component and a second component;

said first component being removably secured to a first side wall of a conventional door jamb having a door hingedly attached thereto and said second component being removably secured to a second side wall of said conventional door jamb;

said first component and said second component are U-shaped and each include a planar wall having opposite ends, a first member and a second member extends outwardly from each end;

said first member and said second member each include an upper edge and a lower edge;

said upper edge is secured to said planar wall;

said first member of said first component includes a plurality of openings; and said openings extends to said lower edge of said first member of said first component for providing said openings to be a groove and a receiving means for receiving hinges of said door.

6. A door frame guard device as in claim 5 wherein a third component is removably secured to a third and upper side wall of said conventional door frame, said third component is U-shaped.

7. A door frame guard device as in claim 6 wherein said first component, said second component and said third component are fabricated from a durable, flexible and resilient material.

8. A door frame guard device as in claim 5 wherein said first component and said second component are fabricated from a durable, flexible and resilient material.

9. A door frame guard device as in claim 5 wherein said first members and said second members of said first component and said second component each include tips, and said tips are coated with a material having a high coefficient of friction.

* * * * *